Figure 6:
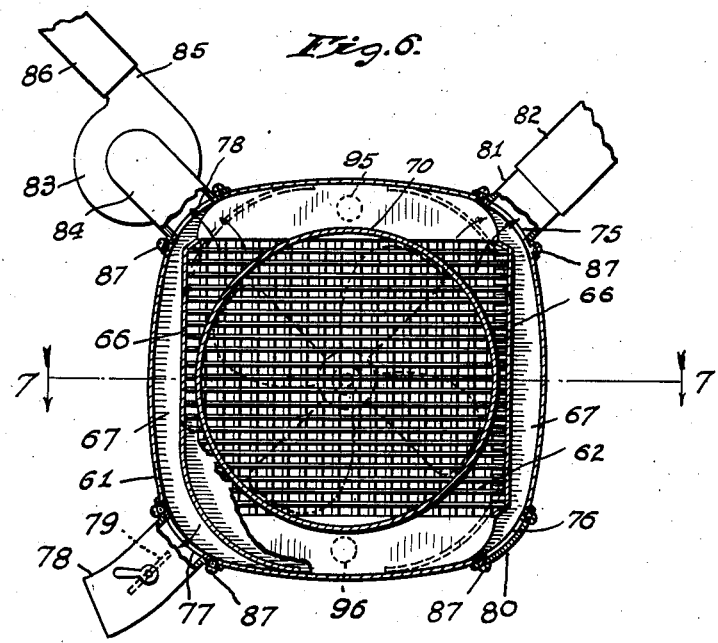

Feb. 20, 1940.                E. C. BOOTH                2,191,420
                                HEATER
                          Filed March 1, 1937          2 Sheets-Sheet 1
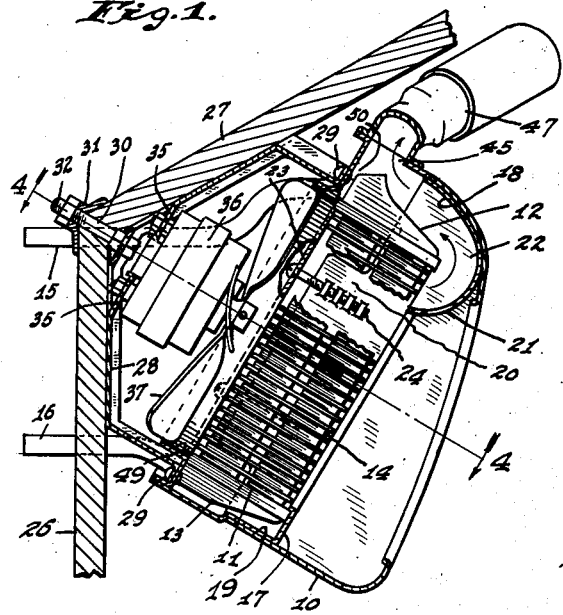
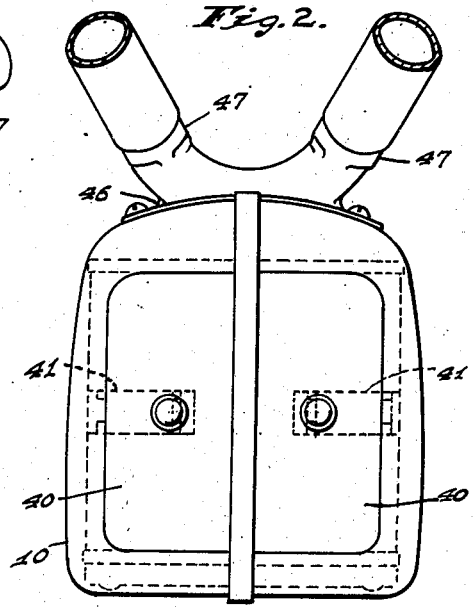
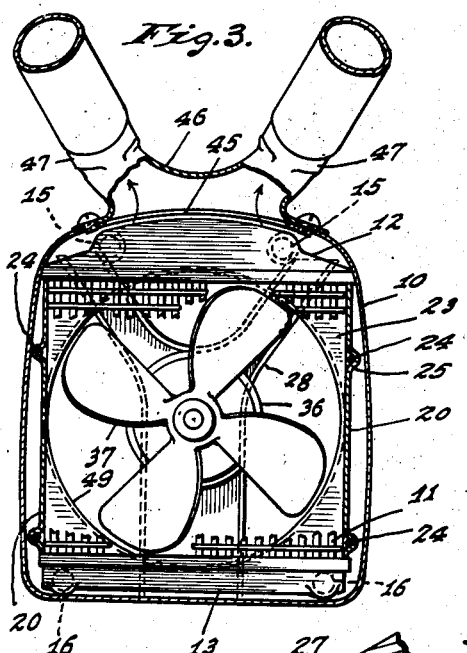
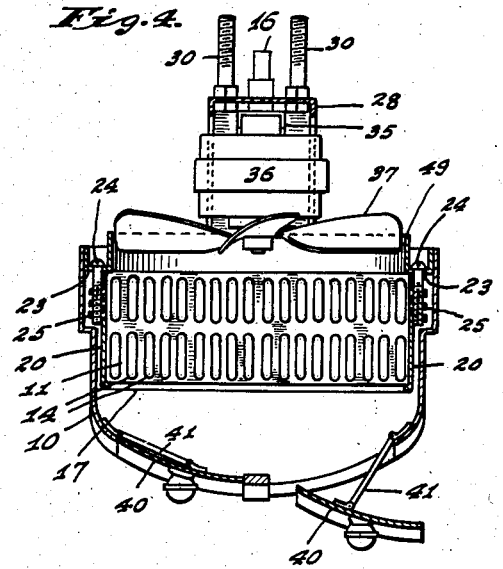
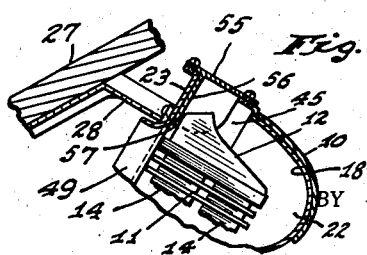
INVENTOR.
EARL C. BOOTH,
BY
ATTORNEYS.

Feb. 20, 1940. E. C. BOOTH 2,191,420
HEATER
Filed March 1, 1937 2 Sheets-Sheet 2

INVENTOR.
EARL C. BOOTH,
BY
ATTORNEYS.

Patented Feb. 20, 1940

2,191,420

UNITED STATES PATENT OFFICE 2,191,420

HEATER

Earl C. Booth, Columbus, Ind., assignor to Noblitt-Sparks Industries, Inc., Columbus, Ind., a corporation of Indiana Application March 1, 1937, Serial No. 128,417

6 Claims. (Cl. 257—137)

My invention is concerned with automobile-body heaters of the type embodying a motor-driven fan which forces air past a core connected in the cooling system of the automobile engine. One object of my invention is to produce a heater which, in addition to its usual function of discharging heated air forwardly into the body of the automobile, will also serve to direct a blast of heated air against the windshield and to direct one or more streams of heated air laterally toward the feet of occupants of the automobile. Another object of my invention is to provide a heater of this kind which will possess great flexibility of installation and use, which can be used either with or without an associated windshield defroster, and to which auxiliary air-discharge nozzles constituting foot warmers can be attached if desired. A further object of my invention is to produce a heater which can be so mounted in the automobile body as to result in less inconvenience to the driver and passenger than is the case with any other heater of which I am aware. Still another object of my invention is to produce a heater which can be installed in a plurality of positions of angular adjustment about its vertical axis, and to provide for any rearrangement of foot warmers and defroster connections which may be necessary or desirable as the result of a change in the position of the heater.

In carrying out the above objects, I mount a fan or other air-moving means in rear of the heater core in position to force air forwardly therethrough; and, within the heater-casing, I provide air deflecting and conducting means which intercept a part of the air discharged through the core and convey it rearwardly of the casing at the sides of the core to one or more auxiliary air-discharge openings located near the rear face of the casing. For association with each auxiliary air-discharging opening I provide fittings some of which are adapted to serve as nipples to be connected to defroster conduits, others of which may serve as simple nozzles discharging air laterally of the heater toward the feet of the automobile driver or front-seat passenger when the heater is mounted on the dash, and still others of which may serve as simple closures. To conserve the space occupied by the heater I may provide a mounting bracket and attaching means so arranged that the heater can be disposed in the angle between a vertical and an inclined section of the dash of the automobile body with the motor which drives the fan or other air-moving means received in this angle.

Figure 7:
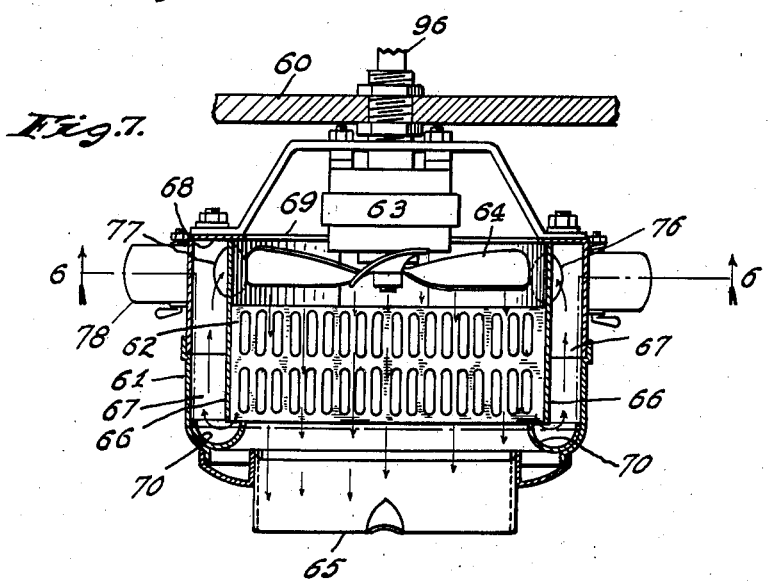

The accompanying drawings illustrate my invention: Fig. 1 is a side elevation of a heater embodying my invention with parts thereof broken away to illustrate the interior construction more clearly; Fig. 2 is a front elevation of the heater; Fig. 3 is a view similar to Fig. 2, but with parts of the casing and core broken away; Fig. 4 is a transverse section on the line 4—4 of Fig. 1; Fig. 5 is a fragmental view similar to Fig. 1 illustrating the arrangement used when the heater embodies no defroster connection; Fig. 6 is a vertical section on the line 6—6 of Fig. 7 showing a modified form of heater; and Fig. 7 is a horizontal section on the line 7—7 of Fig. 6.

In the arrangement illustrated in Figs. 1 to 5 inclusive the heater embodies a casing 10, conveniently formed of sheet-metal, in which is mounted a core 11. The core 11 comprises an upper tank or header 12, a lower tank or header 13, a plurality of tubes 14 interconnecting said tanks, and a series of heat-radiating fins carried by the tubes. The upper tank is provided with a pair of water-supply pipes 15 and the lower tank with a pair of water-discharge pipes 16 adapting the heater for independent connection to each bank of a V-type engine. This particular form of core is illustrated merely as an example; for the present invention is not confined to cores of any particular type or mode of construction.

For the purpose of mounting the core in the casing, the casing is provided intermediately with a transverse partition 17 having at its top and bottom flanges 18 and 19 secured to the casing, conveniently as by spot-welding. At its sides, the partition 17 has flanges 20 which extend rearwardly of the heater, desirably closely adjacent the sides of the core 11. The partition 17 has a large central opening for permitting the passage of air flowing through the core 11. This opening, however, does not extend to the top of the core 11 but instead terminates a short distance from the top of the core; and above such opening the partition is bulged forwardly, as indicated at 21, in spaced relation to the core to provide an air passage 22 leading over the top of the core.

The core is held in place in the casing by being clamped between the partition 17 and the rear wall 23 of the casing. Conveniently, this result is accomplished by screws 24 which pass through the rear casing-wall 23 and are received in suitable provisions 25 on the rearwardly extending flanges of the partition 17.

The heater is mounted through bracket means carried by its rear wall 23. In the arrangement illustrated in Figs. 1 to 5 inclusive the bracket is especially designed for installation of the heater in the angle between a vertical section 26 and an inclined section 27 of the automobile dashboard. The bracket 28 shown is Y-shaped in elevation, as is clear from Fig. 3, its arms being secured to the rear casing wall 23, as by means of rivets 29. In side elevation, the bracket 28 is shaped to conform to the inner surfaces of the dash-sections 26 and 27 and, at the center, is provided with openings for the passage of attaching bolts 30 which extend through the dash at the intersection of the sections 26 and 27 and through a pad 31 adapted to provide a suitable surface for engagement of nuts 32 on the bolts 30.

Above and below the bolts 30 the material of the bracket 28 is deflected inwardly to provide ears 35 to which a motor 36 for driving a suitable fan 37 is attached.

The front wall of the casing is provided with an air-discharge opening with which there may be associated any desired form of air-deflecting and controlling means. As shown in Figs. 2 and 4 the air controlling means takes the form of a pair of shutters 40 pivotally attached respectively to members 41 which, in turn, are pivotally attached to the front wall of the casing adjacent opposite sides of the opening therein. By this arrangement, the discharge of air from the front of the heater can be regulated as desired, both in quantity and in direction.

At the top of the heater-casing 10 and near the rear thereof I provide an auxiliary air discharge opening 45 communicating with the passage 22. When a windshield defroster is to be used in association with the heater, I mount on the casing in line with the opening 45 a discharge fitting 46 desirably formed to provide a branched passage terminating in nipples 47 adapted to be connected with conduits leading to the windshield-defroster nozzles.

In order to increase the flow of air to the defroster nozzles, I prefer to provide a path over which air can reach the fitting 46 directly from the fan 37 without passing through the core 11. To this end, the rear wall 23 of the casing is provided with a rearwardly extending annular flange 49 which serves as a shroud for the fan 37, and at the top of the casing the rear wall is spaced from the core to provide an auxiliary air passage 50 connecting the space within the shroud 49 with the passage 22. The rear casing-wall 23 with the shroud 49 forms a chamber within which, as the fan rotates, a static pressure will be built up; and as a result air will flow through the auxiliary passage 50 into the passage 22 and outwardly through the fitting 46. Air flow over this path is augmented as a result of the action of the fan 37 in throwing air centrifugally from its blades.

If it is desired not to use a defroster in association with the heater, the fitting 46 is desirably replaced by a closure which will act to prevent the escape of air from the opening 45 and to compel all the air discharged from the heater to escape through the opening in the front wall of the heater-casing. Such a closure is shown at 55 in Fig. 5. It may be attached to the heater-casing over the opening 45 in any convenient manner, and desirably embodies an inwardly extending tongue 56 provided at its inner end with a lip 57 which lies against the rear wall of the tank 12 to close the auxiliary air passage 50 and thereby to prevent air escaping from the shroud 49 into the passage 22.

The heater illustrated in Figs. 6 and 7 is adapted for attachment to the plane part of a dash 60. It comprises a casing 61, a core 62 located within the casing, an electric motor 63, and a fan 64 which is driven by the motor and which forces air through the core 62 and outwardly from the casing through an opening in the front wall thereof. Such opening may be provided with shutters 65 to control the volume and direction of the air discharged.

The core 62 is narrower than the casing, and the casing is provided with partitions 66 extending along the sides of the core in spaced relation to the side walls 61 to confine at each side of the core a chamber 67 extending rearwardly to the rear wall 68 of the casing. Over the area occupied by the chambers 67, the rear wall of the casing is closed; but at its center it is provided with an opening 69 to permit the admission of air to the fan 64.

Within the casing and near the front thereof I provide means for collecting a part of the air discharged forwardly through the core and for directing such air into the chambers 67. As shown, this means takes the form of a sheet-metal member 70 of a general ring shape. The member 70 conforms to the shape of the casing 61, and the opening in its center is conveniently circular and has a diameter desirably somewhat less than the width of the core. The member 70 is secured in place in the casing 61 with its inner edge engaging the front face of the core 62 and with its outer edge engaging the side walls of the casing. Between its inner and outer edges the member 70 is bulged forwardly, as is clear from Fig. 7, to direct rearwardly into the chambers 67 the air emerging near the sides of the core.

The casing 61 illustrated in the drawings is, roughly, square with its corners rounded and its sides convexly curved. At the corners of the casing and desirably near the rear face thereof, I provide auxiliary air-discharge openings 75, 76, 77, and 78 each of which communicates with one or the other of the chambers 67. The casing is arranged for the ready attachment of various fittings in association with these openings, the character of these fittings and their location on the casing depending upon the use to which the heater is to be put and its location within the automobile body.

The arrangement illustrated in the drawings is one which could be used if the heater were mounted on the right side of the dash 60 with its water supply and discharge tubes 95 and 96 in the same vertical plane. With the heater at the right of the dash, it is desirable that means be provided for directing some of the heated air discharged toward the feet of the driver occupying a position at the opposite side of the automobile. To this end, the opening 77 at the lower left-hand corner of the casing may have associated with it a discharge nozzle or fitting 78 directed laterally toward the feet of the driver. If desired, this nozzle 78 may be provided with a damper 79 by means of which the quantity of air discharged through it can be regulated. If the heater is mounted at the side of the dash, it will usually be unnecessary to provide more than one of the nozzles 78, and the auxiliary discharge opening 76 at the lower right-hand corner of the casing may be closed with a closure 80.

If it is desired to use one or two windshield defrosters in conjunction with the heater, fittings for their connection may be attached to the openings 75 and 78 at the upper corners of the heater. As shown in Fig. 6, the opening 75 at the upper right-hand corner of the heater is provided with a simple nipple 81 adapted to be received in one end of a flexible conduit 82 leading to a windshield-defroster nozzle suitably arranged in association with the right-hand section of the windshield. Another fitting 81 could, if desired, be used in association with the opening 78 for connection to another defroster nozzle associated with the left-hand section of the windshield. However, because of the greater importance of keeping clear the left-hand section of the windshield in front of the driver and because of the greater length of conduit used in connecting a defroster nozzle at the left of the windshield with a heater at the right of the dash, I prefer to mount in association with the opening 78 a blower 83 having an inlet conduit 84 adapted to be secured to the casing 61 in alinement with the opening 78 and a discharge nipple 85 adapted to be received in a conduit 86 extending to the defroster nozzle for the left-hand section of the windshield.

The various fittings 78, 80, 81, and 83 are so arranged as to be interchangeable. To this end, they are secured to the casing 61 as by means of screws 87 which pass through the closure 80 or through flanges on the respective fittings 78, 80, 81, and 83 into the side wall of the casing 61, all such screws associated with the various fittings being arranged in the same pattern. With this arrangement, a wide variety of installations is possible. If it is not desired to use the heater in connection with windshield defrosters, closures 80 can be provided for the openings 75 and 78. If no foot warmer 78 is desired, a closure 80 can be provided for the opening 78. If defroster connections are desired but the blower is deemed unnecessary, it may be replaced by a fitting 81. If the heater is to be mounted centrally of the dash rather than at one side thereof, a foot warming nozzle 78 can be attached to the heater in association with the opening 76. If the installation of the heater in the automobile is facilitated by disposing the water inlet and discharge tubes 95 and 96 in a horizontal rather than in a vertical position, the auxiliary discharge fittings provided can be rearranged on the casing to leave them in the same relative position with respect to the automobile body.

I claim as my invention:

1. In an automobile-body heater of the circulating fluid type, a casing, a core, a transverse partition secured within said casing and having a central opening, means for clamping said core against said partition in alinement with said opening, said opening being smaller than said core so that a portion of the material of said partition overlaps said core near the periphery thereof, said overlapping portion of said partition being displaced outwardly from the core to define an air passage extending rearwardly past the core at one side thereof, said casing being provided near its rear face with an auxiliary air discharge opening communicating with said passage, a discharge fitting associated with said opening, and means for forcing air forwardly through said core.

2. In an automobile-body heater of the circulating fluid type, a casing, a core, means located in rear of said core for forcing air therethrough, said casing being provided near its rear face with an air-discharge opening, and means within said casing defining an air passage having an inlet opening facing the front face of said core and communicating with said discharge opening, said heater including an auxiliary air passage for conveying air from said air-forcing means directly to said first named passage.

3. In an automobile-body heater of the circulating fluid type, a casing, a core within said casing, a fan located in rear of said core for forcing air therethrough, said casing being provided near its rear face with an air-discharge opening, means within said casing defining an air passage having an inlet opening facing the front face of said core and communicating with said discharge opening, and a shroud encircling said fan co-operating with the rear face of said core to define a chamber, said heater having an auxiliary air passage interconnecting said chamber and said first named passage.

4. The invention set forth in claim 3 with the addition that said shroud is spaced from said core at one point to provide said auxiliary air passage.

5. The invention set forth in claim 2 with the addition of common means for closing both said discharge opening and said auxiliary passage.

6. The invention set forth in claim 2 with the addition of means for closing said auxiliary passage.

EARL C. BOOTH.